US012810824B2

(12) United States Patent
Damron

(10) Patent No.: US 12,810,824 B2
(45) Date of Patent: Nov. 24, 2026

(54) APPARATUSES FOR MEASURING ACTION IN A STRINGED INSTRUMENT

(71) Applicant: Damron Labs LLC, Franklin, TN (US)

(72) Inventor: Mark Damron, Franklin, TN (US)

(73) Assignee: Damron Labs LLC, Franklin, TN (US)

( * ) Notice: Subject to any disclaimer, the term of this patent is extended or adjusted under 35 U.S.C. 154(b) by 216 days.

(21) Appl. No.: 18/622,327

(22) Filed: Mar. 29, 2024

(65) Prior Publication Data

US 2025/0308487 A1 Oct. 2, 2025

(51) Int. Cl.
*G10D 3/00* (2020.01)
*G01B 21/16* (2006.01)

(52) U.S. Cl.
CPC ............... *G10D 3/00* (2013.01); *G01B 21/16* (2013.01)

(58) Field of Classification Search
CPC .................................. G10D 3/00; G01B 21/16
USPC ......................................................... 73/865.9
See application file for complete search history.

(56) References Cited

U.S. PATENT DOCUMENTS 946,426 A 1/1910 Olney
956,858 A 5/1910 Kauffmann
3,229,518 A 1/1966 Nilsson
6,114,618 A 9/2000 Anke
10,837,751 B2 11/2020 Hosokawa
2004/0254002 A1* 12/2004 Tsay ........................ H04M 1/04 455/575.1
2005/0135912 A1 6/2005 Schempf et al.
2006/0162178 A1 7/2006 Freidin
2010/0071172 A1* 3/2010 Huang ................ H10P 72/7608 24/463
2011/0179662 A1 7/2011 Donovan et al.
2013/0181469 A1 7/2013 Williams et al.
2020/0206853 A1 7/2020 Shillabeer
2022/0176518 A1 6/2022 Wohlfahrt et al.
2022/0252215 A1 8/2022 Roth
2022/0373685 A1 11/2022 Dold et al.
2022/0395963 A1 12/2022 Draeger et al.

OTHER PUBLICATIONS

Philadelphia Luther Tools and Supplies, "Digital Nut Slotting Gauge", retrieved from https://web.archive.org/web/20221005110744/https://www.philadelphialuthiertools.com/luthier-tools/measuring-tools/digital-nut-slotting-gauge/, on Feb. 27, 2024, 7 pages.

(Continued)

*Primary Examiner* — Nathaniel T Woodward
(74) *Attorney, Agent, or Firm* — Lowenstein Sandler LLP

(57) ABSTRACT

An apparatus for measuring action in a stringed instrument may include a clamp with two clamp jaws for clamping to the neck of the stringed instrument. The clamp may include a system of gears and tracks such that a user pushing or pulling on one clamp jaw will move the other clamp jaw in an opposite direction. The apparatus may include a plate disposed on the clamp, and the plate may include a surface for disposing a distance-measuring device. The distance-measuring device may measure the action of the stringed instrument. Because the distance-measuring device is disposed on the apparatus, the device can accurately measure the stringed instrument's action even if the instrument is turned on its side.

20 Claims, 9 Drawing Sheets

(56) References Cited

OTHER PUBLICATIONS

StewMac, "Digital Nut Slotting Gauge", retrieved from https://web.archive.org/web/20211016135928/https://www.stewmac.com/luthier-tools-and-supplies/tools-by-job/tools-for-measuring/digital-nut-slotting-gauge, on Feb. 27, 2024, 1 page.
International Search Report and Written Opinion for International Patent Application Serial No. PCT/US2025/022144, dated May 27, 2025 17 pages.
"Stewart MacDonald—Guitarmaking Digital Nut Slotting Gauge" description and purchasing web-page, https://www.stewmac.com/luthier-tools-and-supplies/tools-by-job/tools-for-nuts-and-saddles/digital-nut-slotting-gauge/, accessed May 5, 2026, 4 pages.
"Stewart MacDonald—Fret Rocker" description and purchasing web-page, https://www.stewmac.com/luthier-tools-and-supplies/types-of-tools/straightedges/fret-rocker/, accessed May 5, 2026, 3 pages.
"Stewart MacDonald—FretGuru 2 (8-in-1 Precision String Action Gauge for Guitar Setups) (Inch or Metric+)", escription and purchasing web-page, https://fretguru.com/shop/p/string-action-gauge-guitar-ruler, accessed May 5, 2026, 4 pages.
"Luthier Tools & Jigs For Guitar Making—Guitar Setup Gauges", description and purchasing web-page, https://www.guitarbuilding.solutions/product-page/luthier-tools-string-action-gauge, accessed May 5, 2026, 10 pages.
"Luthiers Mercantile—LMI Digital string height gauge", description and purchasing web-page via Wayback Machine internet archive, https://web.archive.org/web/20211016220742/https://www.lmii.com/measuring-tools/2869-lmi-digital-string-height-gauge.html, accessed May 5, 2026, 5 pages.
"Plek—Making The Worlds Best Guitars Even Better—The Art of The Fingerboard" about web-page, https://plek.com/, accessed May 5, 2026, 5 pages.
"Music Nomad—Precision String Action Gauge", description and purchasing web-page, https://musicnomadcare.com/shop/guitar-setup-tools/precision-string-action-gauge/, accessed May 5, 2026, 3 pages.
"Stewart MacDonald—Understring Radius Gauges", description and purchasing web-page, https://www.stewmac.com/luthier-tools-and-supplies/tools-by-job/tools-for-necks-and-fingerboards/understring-radius-gauges, accessed May 5, 2026, 3 pages.
"Philadelphia Luthier Tools & Supplies—String Action Gauge Inch Ruler", description and purchasing web-page, https://www.philadelphialuthiertools.com/luthier-tools/measuring-tools/string-action-gauge-inch-ruler-guitar-setup-tool/, accessed May 5, 2026, 4 pages.
"Philadelphia Luthier Tools & Supplies String Action Gauge", description and purchasing web-page, https://www.philadelphialuthiertools.com/luthier-tools/measuring-tools/string-action-gauge-inch-ruler-guitar-setup-tool/, accessed May 5, 2026, 4 pages.
"Stewart MacDonald—Radius Gauges" description and purchasing web-page, https://www.stewmac.com/luthier-tools-and-supplies/tools-by-job/tools-for-necks-and-fingerboards/radius-gauges/, accessed May 5, 2026, 3 pages.

* cited by examiner

APPARATUSES FOR MEASURING ACTION IN A STRINGED INSTRUMENT

TECHNICAL FIELD

The instant specification generally relates to apparatuses for musical instruments. More specifically, the instant specification relates to apparatuses for measuring action in a stringed instrument.

BACKGROUND

The "action" of a stringed musical instrument often refers to the distance from a string of the instrument to a part of the instrument's fingerboard. For example, for a guitar, the guitar's action may refer to a distance from one of the guitar strings to a fret on the guitar's fingerboard, or may refer to a distance from one of the guitar strings to the fingerboard itself. The same instrument can produce a very different sound with different actions.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Disclosed herein are apparatuses for measuring action in a stringed instrument. One aspect of the disclosure includes an apparatus that includes a clamp. The clamp may include two clamp jaws. Each clamp jaw may include a clamp piece, a flange angularly disposed on the clamp piece, and a first gear track disposed on the clamp piece. The clamp may include two compound gears. Each compound gear may include a first gear and a second gear disposed on the first gear. The first gear may be larger than the second gear. The respective first gears may be at least partially meshed together. Each second gear may be disposed in a respective gear track of the two clamp jaws. The apparatus may further include a first plate. The first plate may be disposed on the clamp. The first plate may include a surface for disposing a distance-measuring device. The two clamp jaws may be slidable towards or away from each other. Responsive to one of the clamp jaws sliding relative to the first plate, the other clamp jaw may slide in an opposite direction.

Another aspect of the disclosure includes another apparatus that includes a clamp. The clamp may include two clamp jaws. Each clamp jaw may include a clamp piece, a flange angularly disposed on the clamp piece, and a first gear track disposed on the clamp piece. The clamp may include two compound gears. Each compound gear may include a first gear and a second gear disposed on the first gear. The first gear may be larger than the second gear. The respective first gears may be at least partially meshed together. Each second gear may be disposed in a respective gear track of the two clamp jaws. The apparatus may further include a first plate. The first plate may be disposed on the clamp. The apparatus may further include a distance-measuring device disposed on the first plate. The two clamp jaws may be slidable towards or away from each other. Responsive to one of the clamp jaws sliding relative to the first plate, the other clamp jaw may slide in an opposite direction.

Another aspect of the present disclosure includes another apparatus. The apparatus may include a clamp. The clamp may include two clamp jaws. Each clamp jaw may include a clamp piece, a flange angularly disposed on the clamp piece, and a first gear track disposed on the clamp piece. The clamp may include two compound gears. Each compound gear may include a first gear and a second gear disposed on the first gear. The first gear may be larger than the second gear. The respective first gears may be at least partially meshed together. Each second gear may be disposed in a respective gear track of the two clamp jaws. The apparatus may include a first plate disposed above the clamp. The first plate may include arm disposed on the first plate and at least partially extending from a body of the first plate. The arm may include a surface for disposing a distance-measuring device. The apparatus may include a second plate disposed beneath the clamp. The second plate may include a stabilizer bar disposed on a bottom side of the second plate. The two clamp jaws may be slidable towards or away from each other. Responsive to one of the clamp jaws sliding relative to the first plate, the other clamp jaw slides in an opposite direction.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

A stringed musical instrument's action can affect characteristics of the sounds produced by that instrument. Thus, manufacturers and players of stringed instruments are often interested in measuring the instrument's action. For example, a manufacturer of stringed instruments may desire that all of the stringed instruments of a certain type have the same action so that the instruments have a consistent sound. In another example, a first stringed instrument player may wish to adjust the action of the player's instrument to match the action of a second player so that the two players' instruments sound similar. Even very small differences in action can produce very different sound characteristics, thus, accurate action measurements are important for manufacturers and players of stringed instruments.

Unfortunately, conventional devices for measuring a stringed instrument's action have several disadvantages. For example, a user may use a ruler to measure the action, but because the action is so small (often less than 3 millimeters), it can be difficult for the user to accurately determine the action visually using the ruler. Some devices can be placed on a fingerboard of the stringed instrument in order to measure the action. However, such devices require the stringed instrument to be placed on a flat surface with the fingerboard facing up, and they often interfere with the strings of the instrument, both of which makes playing the instrument while measuring and adjusting the action uncomfortable or impossible.

Aspects and implementations of the present disclosure address the above deficiencies, among others, by providing apparatuses for measuring action in a stringed instrument. An apparatus may include a clamp that includes two clamp jaws. The clamp jaws may allow the apparatus to clamp to the neck of a stringed instrument. The jaws may include a system of gear tracks and gears that cause the clamp pieces to slide towards or away from each other in order to adapt to different neck widths. The apparatus may include a plate disposed on the clamp, and the plate may provide a surface for disposing a distance-measuring device on the apparatus.

A user can clamp the apparatus to a stringed instrument's neck, dispose a distance-measuring device on the apparatus, and then use the measuring device to measure the action of the stringed instrument. Because the clamp holds the apparatus away from the fingerboard and strings of the instrument, the apparatus does not interfere with strings of the instrument, making it possible to play the instrument while using the apparatus. Furthermore, because the clamp holds the apparatus to the neck of the instrument, the instrument can be held sidesways while using the apparatus, which can be important for instruments that are played sideways (e.g., a guitar). Thus, the apparatus overcomes many of the disadvantages of conventional means for measuring the action of a stringed instrument, discussed above.

Figure 1:
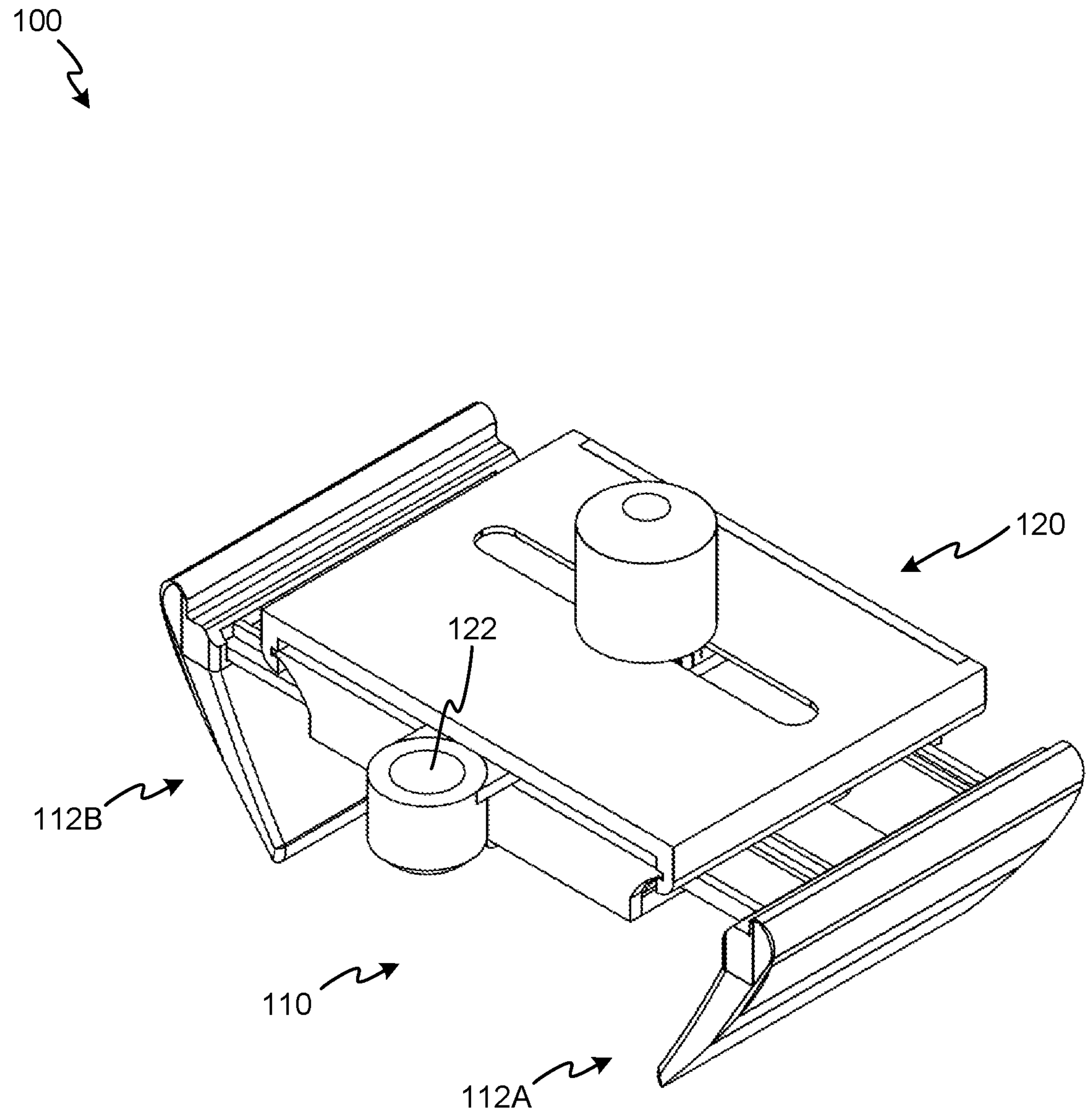
FIG. 1 is a perspective view illustrating an example apparatus for measuring action in a stringed instrument in which selected aspects of the present disclosure may be implemented, in accordance with various embodiments.

FIG. 1 depicts one implementation of an apparatus 100. The apparatus 100 may include an apparatus for measuring action in a stringed instrument. The apparatus 100 may include a clamp 110. The clamp 110 may include two clamp jaws 112A, 112B. The apparatus 100 may include a first plate 120. The first plate 120 may be disposed on the clamp 110. For example, as depicted in FIG. 1, the first plate 120 may be disposed on a top side of the clamp 110. The first plate 120 may include a surface 122 for disposing a distance-measuring device. In some embodiments, the two clamp jaws 112A, 112B are slidable towards or away from each other. Responsive to one of the clamp jaws 112A, 112B sliding relative to the first plate 120, the other clamp jaw 112A, 112B may slide in an opposite direction. The clamp jaws 112A, 112B may grip to a neck of a stringed instrument, and the sliding of the clamp jaws 112A, 112B may allow the apparatus 100 to be disposed on stringed instruments with different neck sizes or may allow the apparatus 100 to be disposed on different portions of the neck of a stringed instrument that have different widths.

Figure 2:
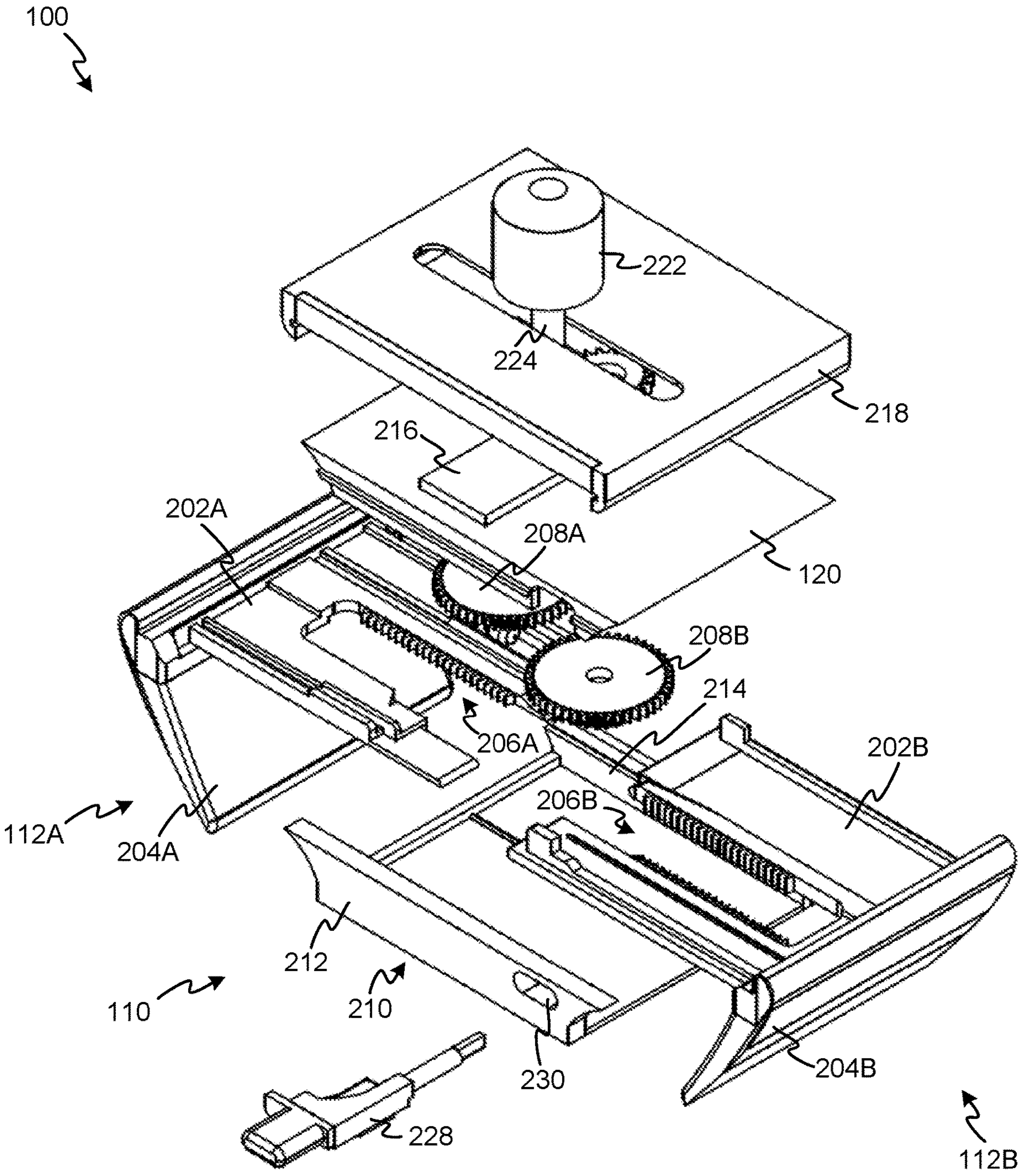
FIG. 2 is an exploded perspective view illustrating the example apparatus of FIG. 1 in which selected aspects of the present disclosure may be implemented, in accordance with various embodiments.

FIG. 2 depicts one implementation of the apparatus 100. As discussed above in relation to FIG. 1, the apparatus 100 can include the clamp 110, which may include the two clamp jaws 112A, 112B. The apparatus 100 may include the first plate 120 with a surface 122 (not shown in FIG. 2) for disposing a distance-measuring device.

In some embodiments, a clamp jaw 112A, 112B may include a clamp piece 202A, 202B. A clamp jaw 112A, 112B may include a flange 204A, 204B. The flange 204A, 204B may be angularly disposed on the respective clamp piece 202A, 202B. A clamp jaw 112A, 112B may include a first gear track 206A, 206B. The first gear track 206A, 206B may be disposed on the respective clamp piece 202A, 202B. In one or more embodiments, the clamp 110 may further include two gears 208A, 208B. The two gears 208A, 208B may be partially meshed together. Each gear 208A, 208B may be disposed in a respective first gear track 206A, 206B of the two clamp jaws 112A, 112B.

In one embodiment, with the gear 208A disposed in the first gear tracks 206A of the clamp piece 202A of the clamp jaw 112A, rotating the gear 208A may cause the clamp piece 202A to slide toward or away from the other clamp jaw 112B (depending on the direction of rotation of the gear 208A). Furthermore, because the two gears 208A, 208B are partially meshed together, rotating one gear 208A may cause the other gear 208B to rotate in the opposite direction. Thus, responsive to a user of the apparatus 100 pushing one clamp jaw 112A toward the other clamp jaw 112B, the movement of the gear track 206A may cause the gear 208A to rotate, and the rotation of the gear 208A may cause the other gear 208B to rotate in the opposite direction, which may cause the other clamp jaw 112B to move toward the first clamp jaw 112A. Thus, the user may move both clamp jaws 112A, 112B by pushing or pulling on only one clamp jaw 112A, 112B.

In one or more embodiments, a clamp piece 202A, 202B may include an elongated piece of material. The material may include a plastic (e.g., polyethylene, polyvinyl chloride (PVC), polypropylene, polystyrene, etc.), a metal (e.g., aluminum, steel, copper, brass, etc.), or some other rigid material. In some embodiments, the clamp pieces 202A, 202B may be shaped and/or sized to allow one clamp piece 202A, 202B to at least partially insert into the other clamp piece 202A, 202B. In some embodiments, the clamp pieces 202A, 202B may be shaped and/or sized to allow one clamp piece 202A, 202B to at least partially slide over the other clamp piece 202A, 202B.

In some embodiments, a flange 204A, 204B may include a piece of rigid material disposed on a clamp piece 202A, 202B. For example, as shown in FIG. 2, each clamp piece 202A, 202B may include a first end (e.g., an end disposed near the other clamp piece 202A, 202B) and a second end disposed opposite the first end. A flange 204A, 204B may disposed on the second end of the clamp piece 202A, 202B. The flange 204A, 204B may be angularly disposed on the second end of the clamp piece 202A, 202B.

A flange 204A, 204B may be sized and shaped to be disposed on a neck of a stringed instrument. For example, as shown in FIG. 2, a flange 204A, 204B may include a curved piece of material. Other shapes may be used for the flange 204A, 204B. In some embodiments, the flange 204A, 204B may include a piece of material used to grip the neck of the stringed instrument. The grip may be disposed on a surface of the flange 204A, 204B. The grip may include a rubber, a polymer (e.g., silicone), or some other gripping material.

In some embodiments, a gear track 206A, 206B may include a series of gear teeth disposed on a clamp piece 202A, 202B. In one embodiment, the gear track 206A, 206B may be disposed in a cutout or other indent in the respective clamp piece 202A, 202B, as is seen in FIG. 2. In other embodiments, the gear track may be disposed on a flat surface of the respective clamp piece 202A, 202B. As can also be seen in FIG. 2, in some embodiments, a gear track 206A, 206B may include a pair of series of teeth, and each series of teeth may be disposed towards the other series of teeth. The gear teeth may be sized and shaped to mesh with the teeth of a gear 208A, 208B.

In one embodiment, the gears 208A, 208B may each include a disc with an aperture disposed in the middle of the disc. In another embodiment, the gears 208A, 208B may each include a disc with a rod intersecting the middle of the disc. Each gear 208A, 208B may include teeth disposed around the edge of the disc. The teeth may be sized and shaped to mesh with a respective gear track 206A, 206B. The teeth may be sized and shaped to mesh with the teeth of the other gear 208A, 208B.

Figure 3:
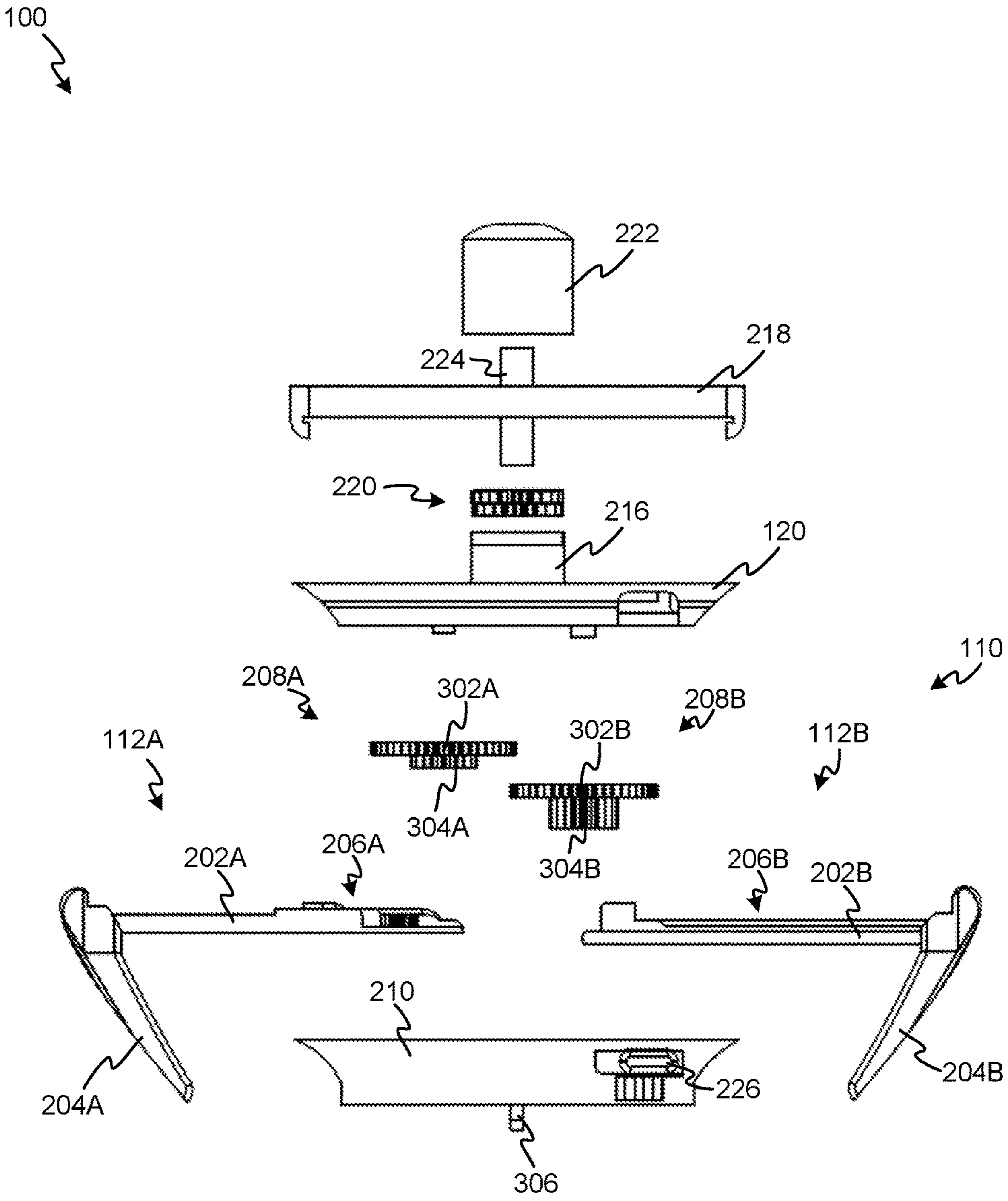
FIG. 3 is an exploded front view illustrating the example apparatus of FIG. 1 in which selected aspects of the present disclosure may be implemented, in accordance with various embodiments.

As seen in FIG. 3, in some embodiments, a gear 208A, 208B may include a compound gear. Each gear 208A, 208B may include a first gear 302A, 302B and a second gear 304A, 304B disposed on the first gear 302A, 302B. The centers of the first gear 302A, 302B, and the second gears 304A, 304B may align. The first gear 302A, 302B may be larger in diameter than the second gear 304A, 304B. In some embodiments, as is seen in FIG. 3, the second gear 304A, 304B of one of the gears 208A, 208B may be longer than the second gear 304A, 304B of the other gear 208A, 208B. The gears 208A, 208B may be sized and positioned such that the respective first gears 302A, 302B are at least partially meshed together. The gears 208A, 208B may be sized and positioned such that each second gear 304A, 304B is disposed in a respective gear track 206A, 206B of the two clamp jaws 112A, 112B.

Figure 4:
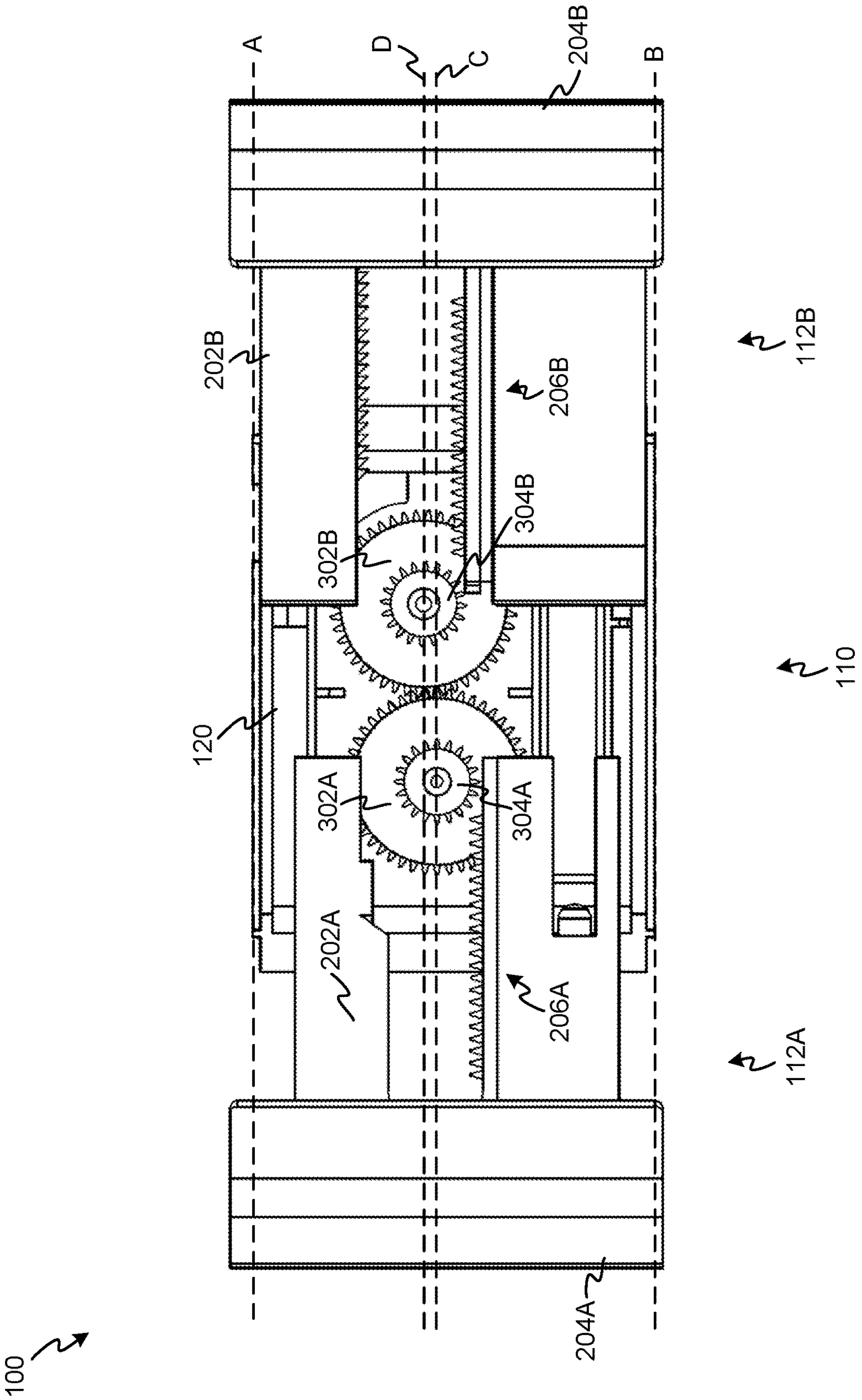
FIG. 4 is a bottom-up view illustrating the example apparatus of FIG. 1 in which selected aspects of the present disclosure may be implemented, in accordance with various embodiments.

As seen in FIG. 4, in some embodiments, the two gears 208A, 208B may be offset from each other relative to the first plate 120 or the clamp pieces 202A, 202B. For example, as seen in FIG. 4, a line A may run the length of an edge of the first plate 120, and a line B may run the length of an opposite edge of the first plate 120. The lines A and B may be parallel. A line C may run parallel to the lines A and/or B and may intersect the center of the first gear 302A and the second gear 304A of the gear 208A. Another line D may run parallel to the lines A and/or B and may intersect the center of the first gear 302B and the second gear 304B of the gear 208B. The lines C and D may also be parallel. As can be seen in FIG. 4, the lines C and D may be slightly offset from each other. The distance between the lines C and D may include 1 mm, 2 mm, 3 mm, or some other distance. In some embodiments, the gears 208A and 208B may be offset from each other so that the second gear 304A pertaining to one clamp piece 202A does not come into contact with the first gear track 206B disposed on the other clamp piece 202B, and vis versa.

Returning to FIG. 2 and FIG. 3, in some embodiments, the apparatus 100 may include a second plate 210. The second plate 210 may be disposed on a bottom side of the clamp 110. The second plate 210 may include a stabilizer bar 306 disposed on a bottom side of the second plate 210. The stabilizer bar 306 may include a piece of material that extends from a bottom size of the second plate 210 and that runs perpendicular to the length of the clamp 110. The stabilizer bar 306 may be in the perpendicular position in order to run parallel with one or more strings of the stringed instrument on which the apparatus 100 may be disposed. The stabilizer bar 306 may provide a third point of contact for the apparatus on the stringed instrument (the first two points of contact being the two flanges 204A, 204B). The stabilizer bar 306 may prevent the bottom side of the second plate 210 from contacting the strings of the stringed instrument on which the apparatus 100 may be disposed.

In one embodiment, the second plate 210 may include a pair of tracks. The pair of tracks may be disposed on an interior portion of a pair of plate walls 212, 214 of the second plate 210. The tracks may include grooves or other indentations wherein the clamp pieces 202A, 202B may be disposed. The two clamp jaws 112A, 112B may be slidably disposed in the pair of tracks. Thus, the second plate 210 may provide a housing for the clamp jaws 112A, 112B.

Figure 5:
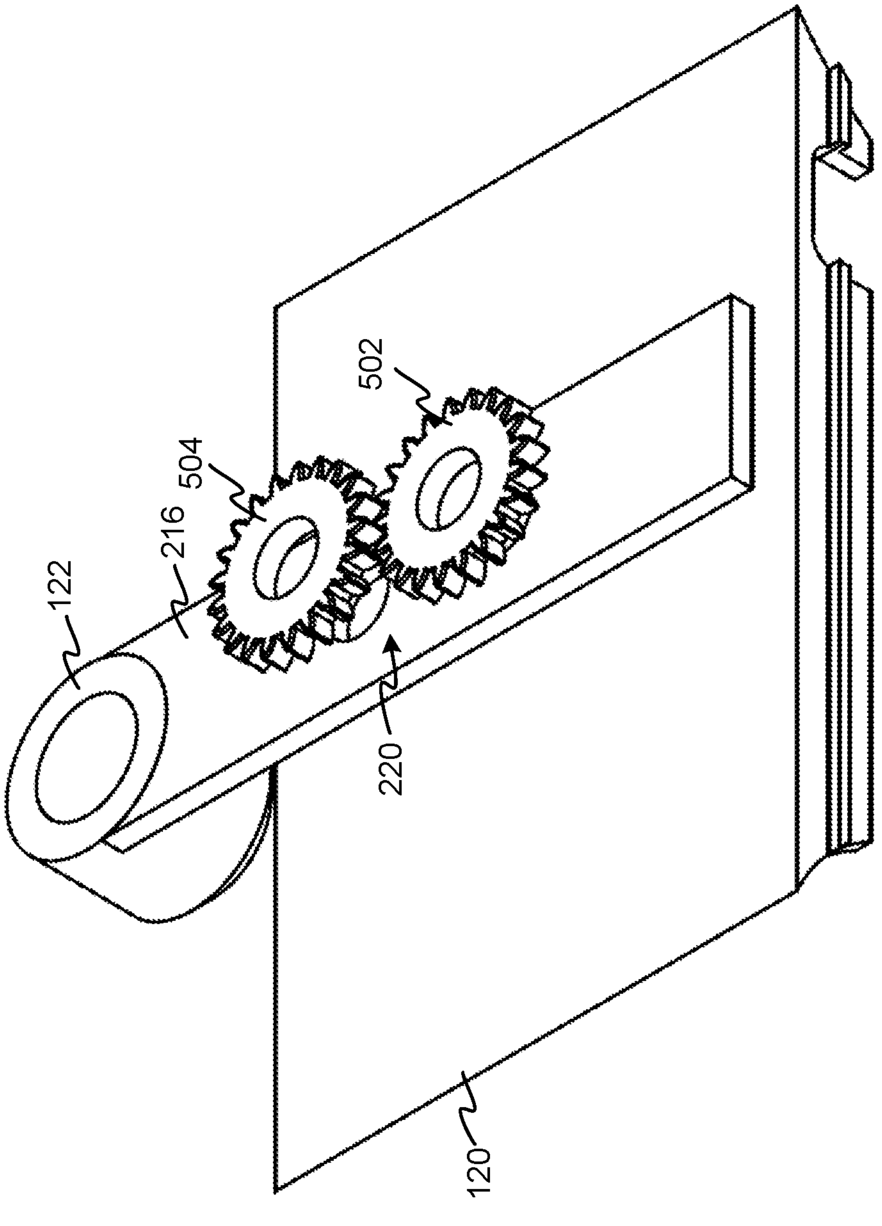
FIG. 5 is a perspective view illustrating one example of a first plate for the example apparatus of FIG. 1 in which selected aspects of the present disclosure may be implemented, in accordance with various embodiments.

As seen in FIG. 2, FIG. 3, and FIG. 5, in some embodiments, the surface 122 for disposing the distance-measuring device may include an arm 216. The arm 216 may be disposed on the first plate 120 and may at least partially extend from the body of the first plate 120. The body may include the major portion of the first plate 120 (e.g., the portion of the first plate 120 depicted in at least partially extending from a body of the first plate 120). The arm 216 may dispose the surface 122 for disposing the distance measuring device away from other components of the apparatus 100 so the distance-measuring device can measure the action without interference from the other components of the apparatus 100. As can be seen in FIG. 1 and FIG. 5, in one or more embodiments, the surface 122 for disposing the distance-measuring device may include a tube. The tube may include an elongated material with an aperture through the material. The distance measuring device may be disposed on an upper side of the rim of the tube. The surface 122 for disposing the distance-measuring device may include some other shape or configuration that holds the distance-measuring device.

As can be seen in FIG. 2 and FIG. 3, in one or more embodiments, the apparatus 100 may include a third plate 218. The third plate 218 may be disposed above the first plate 120. The third plate 218 may include one or more gears 220. The one or more gears 220 may be rotatably disposed on the surface 122 for disposing the distance-measuring device. For example, as seen in FIG. 3 and FIG. 5, the one or more gears 220 may include a first gear 502 and a second gear 504. The first gear 502 may attach to a rod 224 (discussed below) and may partially mesh with the second gear 504. The second gear 502 may be rotatably disposed on the arm 216 of the first plate 120.

Figure 6A:
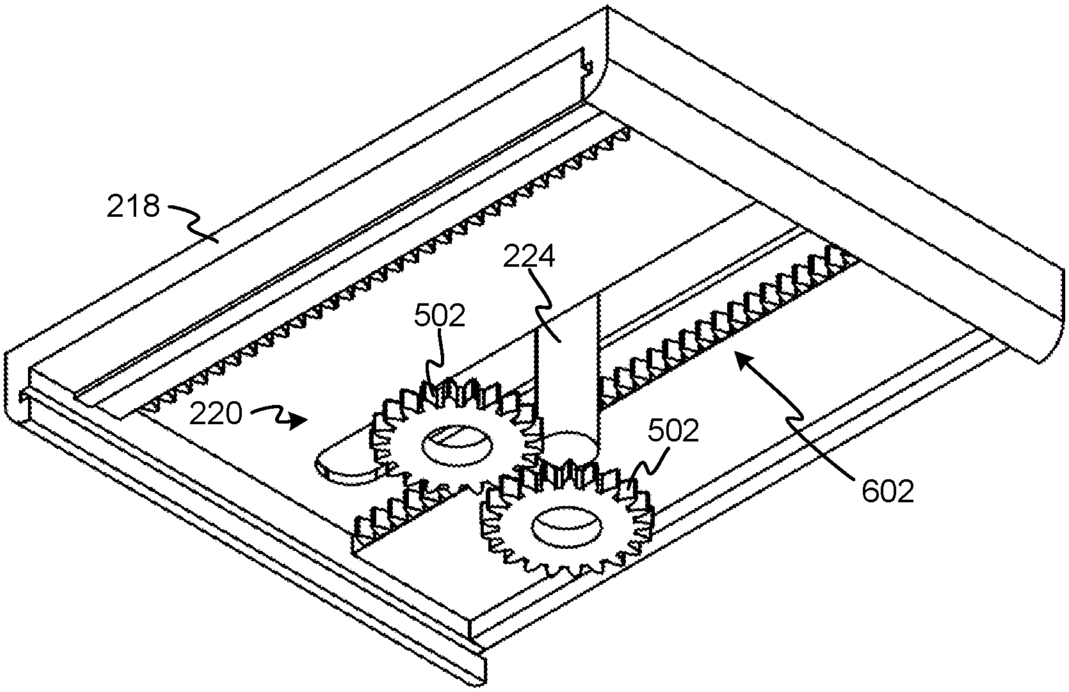
FIG. 6A is a perspective view illustrating one example of a third plate for the example apparatus of FIG. 1 in which selected aspects of the present disclosure may be implemented, in accordance with various embodiments.
Figure 6B:
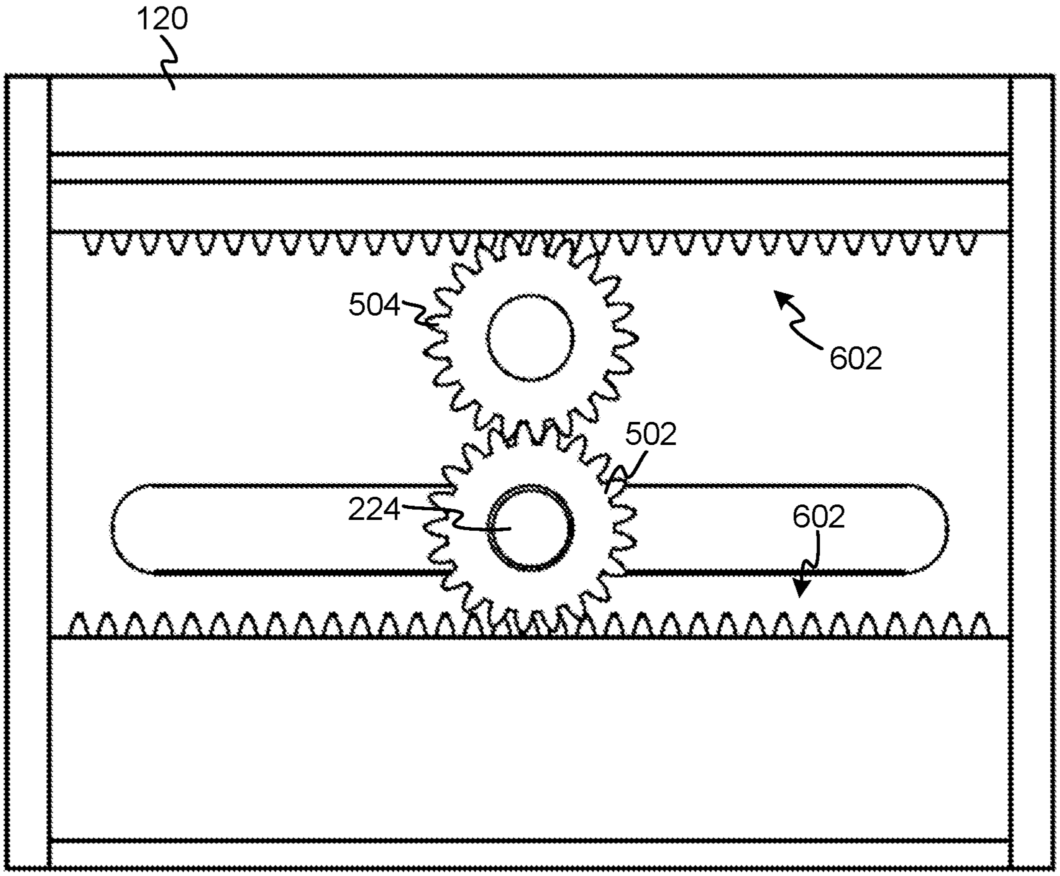
FIG. 6B is a bottom-up view illustrating one example of the third plate of FIG. 6A in which selected aspects of the present disclosure may be implemented, in accordance with various embodiments.

As seen in FIG. 6A and FIG. 6B, in some embodiments, the third plate 218 may include a second gear track 602. The second gear track 602 may be disposed on the third plate 218. For example, as seen in FIG. 6A and FIG. 6B, the second gear track 602 may be disposed on a bottom side of the third plate 218 (i.e., between the body of the third plate 218 and the second plate 210). At least some of the one or more gears 220 may be disposed in the second gear track 602. For example, as seen in FIG. 6B, the first gear 502 may at least partially mesh with one series of gear teeth of the second gear track 602, and the second gear 504 may at least partially mesh with another series of gear teeth of the second gear track 602. The surface 122 for disposing the distance-measuring device may be translatable on the first plate 120 via the one or more gears 220 and the second gear track 602. For example, in response to rotating a gear of the one or more gears 220 in the second gear track 602, the arm 216 connected to the one or more gears 220 may slide along the second gear track 602.

As seen in FIG. 2 and FIG. 3, the apparatus 100 may include a knob 222. The knob 222 may be disposed on a gear of the one or more gears 220. For example, the knob 222 may include a rod 224 extending from a bottom side of the knob 222, and the rod 224 may insert into a gear of the one or more gears 220 (e.g., the first gear 502). As seen in FIG. 2, the top of the third plate 218 may include a slot that may run at least partially through the third plate 218 through which the rod 224 may be disposed. The surface 122 for disposing the distance-measuring device may be translatable on the first plate 120 via the one or more gears 220 and the second gear track 602 responsive to rotation of the knob 222.

As also seen in FIG. 2 and FIG. 3, the apparatus 100 may include a spring 226. The spring 226 may be disposed on at least one of the two clamp jaws 112A, 112B. The spring 226 may compress in response to the two clamp jaws 112A, 112B sliding towards each other. For example, responsive to a user of the apparatus 100 pushing on a clamp jaw 112A, 112B, the clamp jaw 112A, 112B may slide toward the other clamp jaw 112A, 112B and may compress the spring 226. The apparatus 100 may include a spring-loaded release device 228. The spring-loaded release device 228 may include an elongated piece of material that is insertable into the second plate 210 (e.g., via the aperture 230). The spring-loaded release device 228 may be selectably interactable with the spring 226. Responsive to the spring-loaded release device 228 interacting with the spring 226, the spring 226 may revert to an uncompressed state and may cause the two clamp jaws 112A, 112B to slide away from each other. By interacting with the spring-loaded release device 228, the user of the apparatus 100 may extend the clamp jaws 112A, 112B without having to pull on the clamp jaws 112A, 112B.

In some embodiments, the first plate 120 may be disposed on a bottom side of the clamp 110. The first plate 120 may include the stabilizer bar 306, which may be disposed on a bottom side of the first plate 120. In some embodiments, the first plate 120 may include one or more tracks in which the clamp jaws 112A, 112B may be disposed. The first plate may include the spring 226 and the spring-loaded release device 228.

Figure 7:
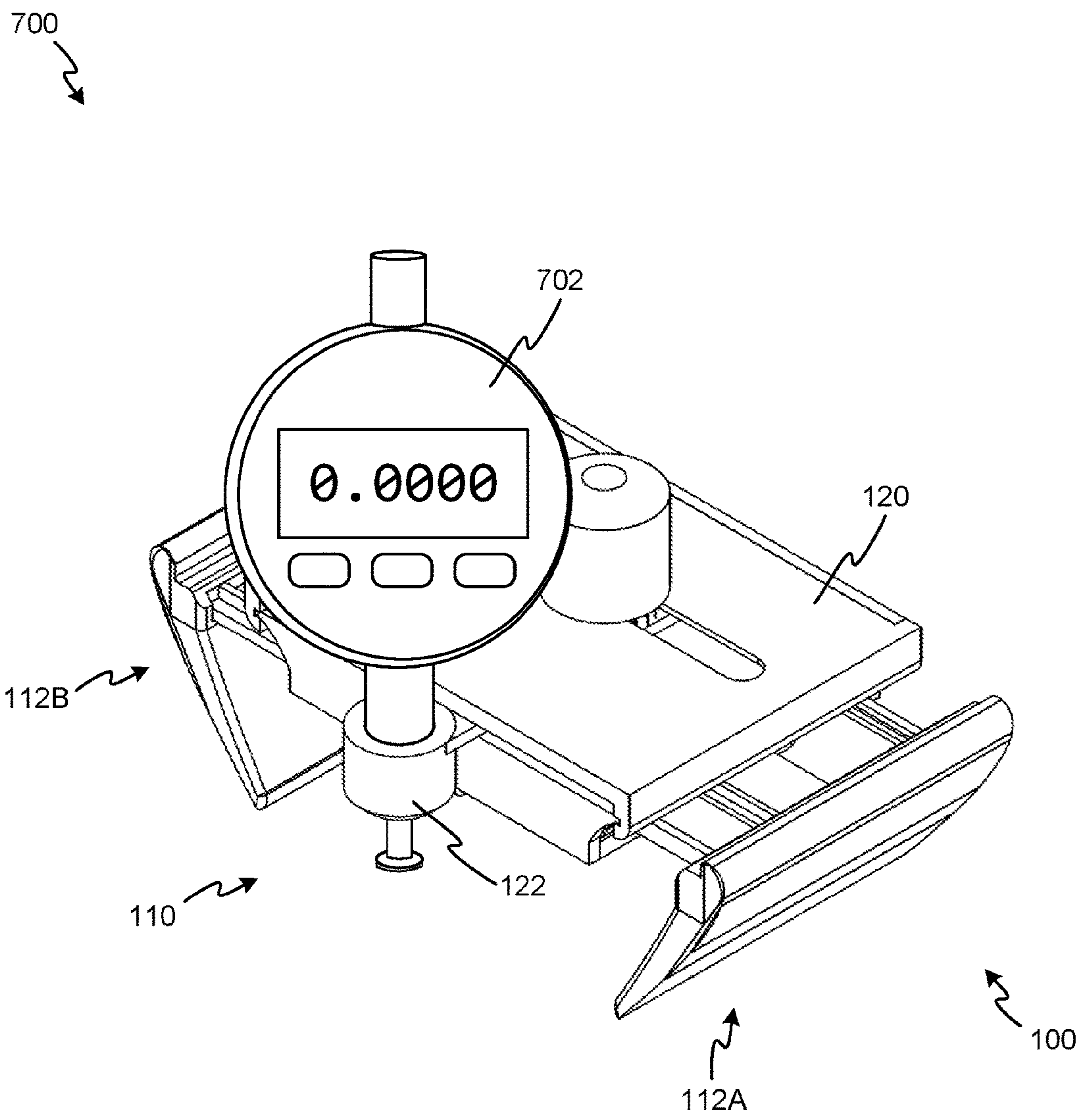
FIG. 7 is a perspective view illustrating an example apparatus for measuring action in a stringed instrument in which selected aspects of the present disclosure may be implemented, in accordance with various embodiments.

FIG. 7 depicts one embodiment of an apparatus 700. The apparatus 700 may include an apparatus for measuring action in a stringed instrument. The apparatus 700 may include an apparatus 100 as depicted in FIGS. 1-6, as discussed above. The apparatus 700 may include a distance-measuring device 702. The distance-measuring device 702 may include a device that measures a distance between two points. The distance-measuring device 702 may be disposed on the surface 122. The distance-measuring device 702 may be selectably disposable on the surface 122, or the distance-measuring device 702 may be integrated into the apparatus 100.

In some embodiments, as depicted in FIG. 7, the distance-measuring device 702 may include a drop indicator (sometimes called a "drop gauge"). A drop indicator may include a device that measures the displacement of a stem of the device. The distance-measuring device 720 may include a light detection and ranging (lidar) distance sensor. The lidar distance sensor may emit a laser toward a target, measure the time for the reflected light of the laser to return to a receiver, and calculate a distance based on the time.

In one or more embodiments, the distance-measuring device 702 may include an infrared distance sensor. The infrared distance sensor may emit infrared light toward a target, measure the time for the reflected infrared light to return to a receiver, and calculate a distance based on the time. The distance-measuring device 702 may include an ultrasonic distance sensor. The ultrasonic sensor may emit an ultrasonic wave toward a target, measure the time for the reflected ultrasonic wave to return to a receiver, and calculate a distance based on the time. The distance-measuring device 702 may include a laser distance sensor. A laser distance sensor may include a laser rangefinder (sometimes called a "laser telemeter"). In some embodiments, the distance-measuring device 702 may include a display on which may be displayed a distance measurement taken by the distance-measuring device 702.

In one embodiment, the apparatus 700 may further include a wireless input/output (I/O) interface. The wireless I/O interface may be configured to wirelessly communicate data from the distance-measuring device 702 to a computing device. The wireless I/O interface may be included in the distance-measuring device 702 or may be included in the apparatus 100.

Figure 8:
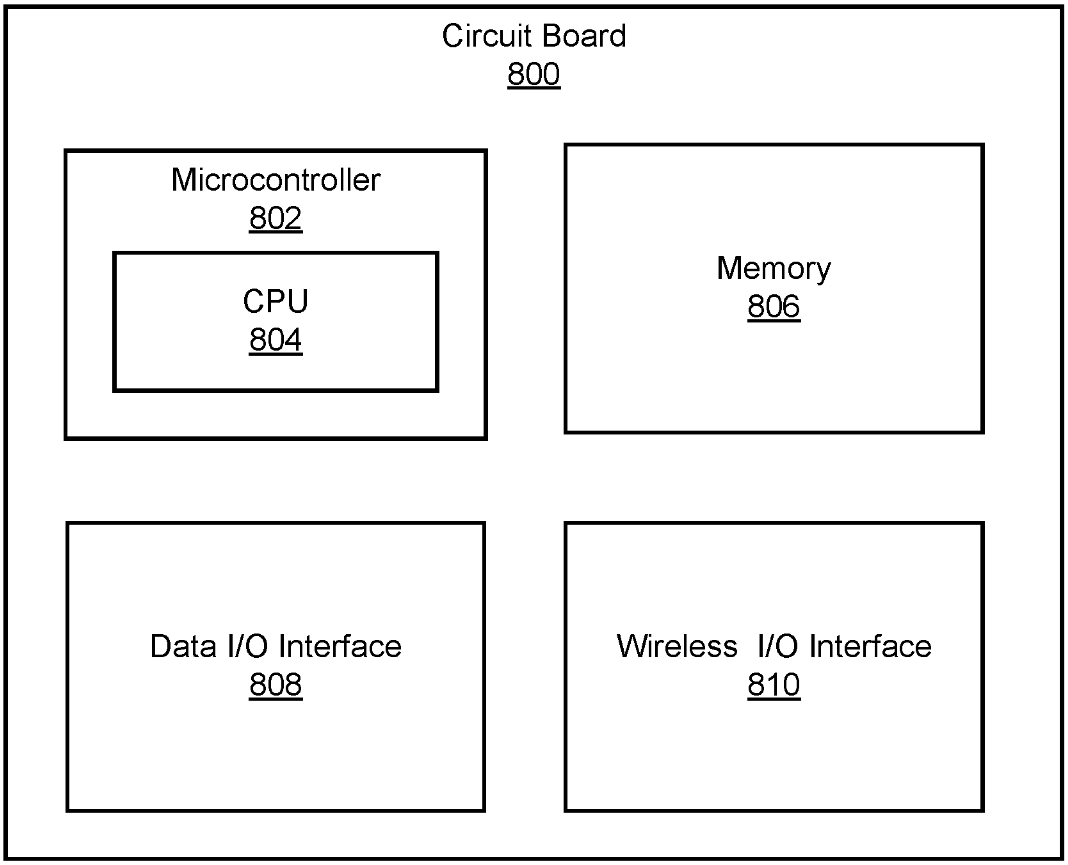
FIG. 8 is a schematic block diagram illustrating an example circuit board for the apparatus of FIG. 1 or FIG. 7 in which selected aspects of the present disclosure may be implemented, in accordance with various embodiments.

FIG. 8 depicts one example embodiment of a circuit board 800. The circuit board 800 may include a printed circuit board assembly (PCBA). The circuit board 800 may include a microcontroller 802. The microcontroller 802 may include a self-contained computer on a single integrated circuit (IC) that is designed to perform specific tasks. The microcontroller 802 may include a central processing unit (CPU) 804. The circuit board 800 may include a memory 806, which may store data used by the microcontroller 802. The circuit board 800 may include a data I/O interface 808. The circuit board 800 may include a wireless I/O interface 810. The microcontroller 802 or the memory 806 may include one or more programs or other software. The one or more programs may execute on the microcontroller 802. In some implementations, the microcontroller 802 may include firmware, embedded programs, or other data.

The CPU 804 may include a central processing unit (CPU), a processing core, or the like. More particularly, the CPU 804 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The CPU 804 can also be one or more special-purpose processing devices such as an application-specific integrated circuit (ASIC), a field programmable gate array (FPGA), a digital signal processor (DSP), or the like. The CPU 804 may be configured to execute instructions (e.g., for performing one or more operations described herein).

The memory 806 may include volatile memory or non-volatile memory. The memory 204 may include read-only memory (ROM), flash memory, dynamic random-access memory (DRAM) such as synchronous DRAM (SDRAM), double data rate (DDR SDRAM), or DRAM (RDRAM), static random-access memory (SRAM), or some other type of memory. The memory 806 may store the one or more programs that execute by way of the CPU 804.

In one implementation, the data I/O interface 808 may include an interface between the circuit board 800 and the distance-measuring device 702. The data I/O interface may receive data from the distance-measuring device 702 via a cable, the wireless I/O interface 810, or some other component. The data I/O interface 808 may provide the data to the CPU 804. The CPU 804 may process the data and store the processed data in the memory 806. In some implementations, the data may include a measurement taken by the distance-measuring device 702.

In some implementations, the wireless I/O interface 810 may be in data communication with a mobile device. The mobile device may include a wireless-capable device of the user of the apparatus 100 or 700. The user's mobile device may include a smartphone, a tablet, a laptop computer, or some other wireless-capable device. The wireless I/O interface 810 may include a Bluetooth interface, a Wi-Fi interface, or an interface for some other wireless protocol. The wireless I/O interface 810 may send a wireless signal to the mobile device, and the wireless signal may include data stored by the memory 806 (e.g., a distance measurement). In one implementation, the user's mobile device may include a mobile application or some other software that the user may use to receive a wireless signal from the wireless I/O interface 810.

In one example, the distance-measuring device 702 may be disposed on the apparatus 100, and the apparatus 100 may be disposed on a stringed instrument. A user of the apparatus 100 and the stringed instrument may operate the distance-measuring device 702 to measure the distance between a string of the stringed instrument and the fingerboard of the stringed instrument. The distance-measuring device 702 may provide the measurement to the circuit board 800. The circuit board 800 may be part of the distance-measuring device 702 or may be part of the apparatus 100. The data I/O interface 808 may receive the measurement from the distance-measuring device 702. The microcontroller 802 may store the measurement in the memory 806. The microcontroller 802 may provide the measurement to the wireless I/O interface, which may wirelessly communicate the measurement to a mobile device of the user of the apparatus 100.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Reference throughout this specification to "one embodiment," "an embodiment," or "some embodiments" mean that a particular feature, structure, or characteristic described in connection with the implementation or embodiment is included in at least one implementation or embodiment. Thus, the appearances of the phrase "in one implementation" or "in an implementation" or other similar terms in various places throughout this specification are not necessarily all referring to the same implementation. In addition, the term "or" is intended to mean an inclusive "or" rather than an exclusive "or." Moreover, the word "example" or a similar term are used herein to mean serving as an example, instance, or illustration. Any aspect or design described herein as an "example" is not necessarily to be construed as preferred or advantageous over other aspects or designs. Rather, use of the word "example" or a similar term is intended to present concepts in a concrete fashion.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

The use of terms such as "above," "below," "top," "bottom," or similar terms may be relative to a selected orientation. Components can be positioned and function in any spatial orientation without a fundamental change in their functionality. Therefore, a skilled artisan would understand that these terms are used for clarity of description and do not limit the applicability of the invention in any particular direction.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms that refer to the actions and processes of an electronic device that manipulates and transforms data represented as physical (e.g., electronic) quantities within the electronic device's registers and memories into other data similarly represented as physical quantities within the memories or registers or other such information storage, transmission, or display devices.

Certain embodiments of the present disclosure also relate to an electronic device for performing the operations herein. This electronic device can be constructed for the intended purposes, or it can comprise a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, random access memories (RAMs), EPROMs, EEPROMs, magnetic or optical cards, or any type of media suitable for storing electronic instructions.

As used in this application, the terms "component," "module," "system," or the like, when used to refer to an electronic device, may refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware;

generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. An apparatus, comprising:
- a clamp comprising two clamp jaws that are configured to slide relative to each other;
- a first plate disposed on the clamp, the first plate being coupled to an arm that is configured to connect to a distance-measuring device;
- an upper plate disposed above the first plate, wherein the upper plate forms a gear track; and
- a gear disposed in the gear track, wherein the arm is translatable on the first plate via the gear and the gear track.

2. The apparatus of claim 1, wherein:
- the first plate is disposed on a top side of the clamp; and
- the apparatus further comprises a second plate disposed on a bottom side of the clamp, the second plate comprising a stabilizer bar disposed on a bottom side of the second plate.

3. The apparatus of claim 2, wherein:
- the second plate further comprises a pair of tracks; and
- the two clamp jaws are slidably disposed in the pair of tracks.

4. The apparatus of claim 1, wherein the arm is disposed on the first plate and is at least partially extending from a body of the first plate.

5. The apparatus of claim 1, wherein:
- the two clamp jaws each comprise a clamp piece, a flange angularly disposed on the clamp piece, and a first gear track disposed on the clamp piece;
- the clamp further comprises two compound gears, each of the two compound gears comprising a first gear and a second gear disposed on the first gear;
- for each of the two compound gears, the first gear is larger than the second gear;
- the first gear or a first of the two compound gears and the first gear of a second of the two compound gears are at least partially meshed together;
- each second gear of the two compound gears is disposed in a respective first gear track of the two clamp jaws;
- the two clamp jaws are slidable towards or away from each other;
- responsive to a first clamp jaw of the two clamp jaws sliding relative to the first plate, a second clamp jaw of the two clamp jaws slides in an opposite direction;
- the gear track formed by the upper plate is a second gear track;
- the gear is rotatably disposed on the arm; and
- the arm is translatable on the first plate via the gear and the second gear track.

6. The apparatus of claim 5, further comprising a knob disposed on the gear, wherein the arm is translatable on the first plate via the gear and the second gear track responsive to rotation of the knob.

7. The apparatus of claim 5, wherein the two compound gears are offset from each other relative to the first plate.

8. The apparatus of claim 1, further comprising:
- a spring disposed on at least one of the two clamp jaws, wherein the spring compresses responsive to the two clamp jaws sliding towards each other; and
- a spring-loaded release device selectably interactable with the spring, wherein responsive to the spring-loaded release device interacting with the spring, the spring reverts to an uncompressed state and causes the two clamp jaws to slide away from each other.

9. The apparatus of claim 1, wherein the first plate:
- is disposed on a bottom side of the clamp; and
- further comprises a stabilizer bar disposed on a bottom side of the first plate.

10. The apparatus of claim 1, wherein the arm is configured to connect to the distance-measuring device such that the distance-measuring device is configured to measure a distance between the distance-measuring device and an object to which the apparatus is clamped.

11. An apparatus, comprising:
- a clamp comprising two clamp jaws that are configured to slide relative to each other;
- a first plate disposed on the clamp; and
- a distance-measuring device coupled to the first plate, wherein the distance-measuring device comprises a drop indicator.

12. The apparatus of claim 11, wherein the distance-measuring device further comprises a lidar distance sensor.

13. The apparatus of claim 11, wherein the distance-measuring device further comprises an infrared distance sensor.

14. The apparatus of claim 11, wherein the distance-measuring device further comprises an ultrasonic distance sensor.

15. The apparatus of claim 11, wherein the distance-measuring device further comprises a laser distance sensor.

16. The apparatus of claim 11, further comprising a wireless input/output (I/O) interface configured to wirelessly communicate data from the distance-measuring device to a computing device.

17. An apparatus, comprising:
- a clamp comprising two clamp jaws that are configured to slide relative to each other;
- a first plate disposed above the clamp, the first plate being coupled to an arm that is configured to connect to a distance-measuring device; and a second plate disposed beneath the clamp, the second plate comprising a stabilizer bar that extends from a bottom side of the second plate.

18. The apparatus of claim 17, wherein:

the first plate further comprises a pair of tracks; and the two clamp jaws are slidably disposed in the pair of tracks.

19. The apparatus of claim 17, wherein:

the two clamp jaws each comprise a clamp piece, a flange angularly disposed on the clamp piece, and a first gear track disposed on the clamp piece;

the clamp comprises two compound gears, each of the two compound gears comprising a first gear and a second gear disposed on the first gear;

for each of the two compound gears, the first gear is larger than the second gear;

the first gear of a first of the two compound gears and the first gear of a second of the two compound gears are at least partially meshed together;

each second gear of the two compound gears is disposed in a respective first gear track of the two clamp jaws;

the two clamp jaws are slidable towards or away from each other;

responsive to a first clamp jaw of the two clamp jaws sliding relative to the first plate, a second clamp jaw of the two clamp jaws slides in an opposite direction;

the apparatus further comprising:

a third plate disposed above the first plate, wherein the third plate comprises a second gear track disposed on the third plate; and a gear disposed in the second gear track and rotatably disposed on the arm; and the arm is translatable on the first plate via the gear and the second gear track.

20. The apparatus of claim 17, further comprising:

a spring disposed on at least one of the two clamp jaws, wherein the spring compresses responsive to the two clamp jaws sliding towards each other; and a spring-loaded release device selectably interactable with the spring, wherein responsive to the spring-loaded release device interacting with the spring, the spring reverts to an uncompressed state and causes the two clamp jaws to slide away from each other.

* * * * *